(12) United States Patent
Ikeda

(10) Patent No.: US 6,612,730 B1
(45) Date of Patent: Sep. 2, 2003

(54) ROD-SHAPED LIGHT GUIDE AND ILLUMINATING DEVICE INCORPORATING ROD-SHAPED LIGHT GUIDE

(75) Inventor: Makoto Ikeda, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 46 days.

(21) Appl. No.: 09/713,613

(22) Filed: Nov. 15, 2000

(30) Foreign Application Priority Data

Nov. 19, 1999 (JP) .......................................... 11-330073

(51) Int. Cl.$^7$ ............................................... G03B 27/74
(52) U.S. Cl. ........................ 362/558; 362/31; 362/555; 362/551; 362/582
(58) Field of Search ................................ 385/133, 146, 385/901; 362/31, 555, 581, 582, 551, 558, 268; 355/67–71

(56) References Cited

U.S. PATENT DOCUMENTS 4,239,383 A * 12/1980 Peterson ...................... 355/67
4,827,314 A * 5/1989 Fujiwara ...................... 355/68
5,835,195 A * 11/1998 Gibson et al. ................ 355/53
6,333,777 B1 * 12/2001 Sato ............................. 355/53
6,333,779 B1 * 12/2001 Tabata et al. ................. 355/68

FOREIGN PATENT DOCUMENTS

| JP | 8163320 | 6/1994 |
| JP | 10126581 | 4/1997 |

* cited by examiner

Primary Examiner—Thomas M. Sember
Assistant Examiner—Anabel Ton
(74) Attorney, Agent, or Firm—Merchant & Gould P.C.

(57) ABSTRACT

A light scattering pattern is disposed near the focus of a curved surface regarded as a concave mirror. Scattered light reflected by the curved surface and emitted from a planar surface is focused at a predetermined focused position. If the predetermined focused position and an image surface to be read are aligned with each other, then the scattered light from the light scattering pattern falls fully on the image surface without being wasted, so that a spatial light intensity distribution in an auxiliary scanning direction is uniformized.

14 Claims, 4 Drawing Sheets

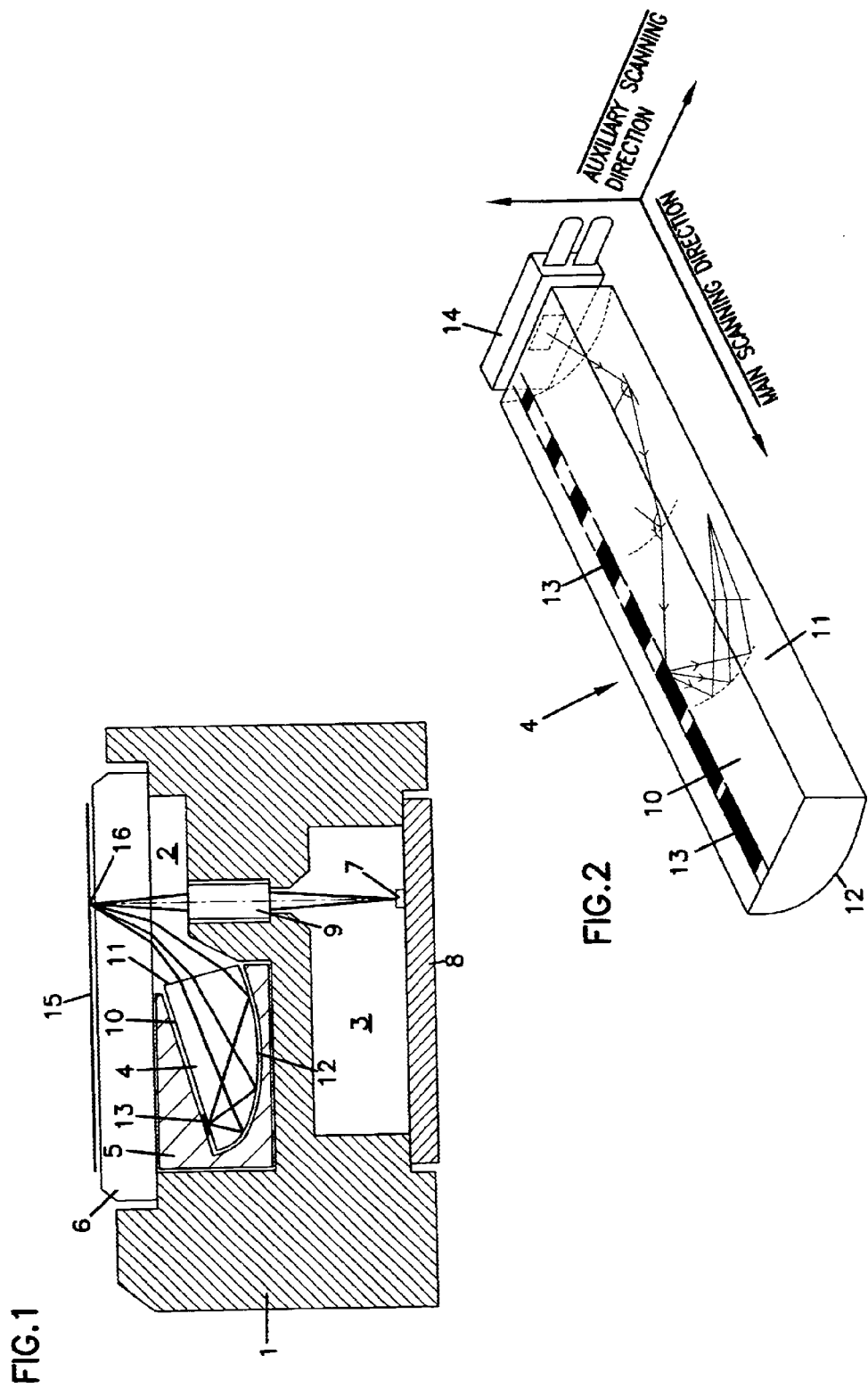

ROD-SHAPED LIGHT GUIDE AND ILLUMINATING DEVICE INCORPORATING ROD-SHAPED LIGHT GUIDE

BACKGROUND OF THE INVENTION

1. Field of the Invention

The present invention relates to a rod-shaped light guide for use in a facsimile machine, a copying machine, a scanner, etc., and an illuminating device which incorporates such a rod-shaped light guide.

2. Description of the Related Art

Facsimile machines, copying machines, scanners, etc. employ an image reading device such as an image sensor for reading subjects. One type of such an image reading device comprises a contact-type image sensor having a short light path length which allows the image sensor to be easily incorporated in those machines and scanners.

The contact-type image sensor reads a section of the subject which is being illuminated by an illuminating device to an illuminance level that is required to read the section of the subject. The section of the subject which is illuminated in a strip-like range that is considerably long in a main scanning direction, i.e., a longitudinal direction thereof, and short in an auxiliary scanning direction perpendicular to the main scanning direction.

In order to illuminate such a narrow strip-like range, the illuminating device heretofore comprises an array of LEDs (light-emitting diodes) mounted on a printed-wiring board by wire bonding or soldering. The array of LEDs tends to produce a waste of illuminating light because effective light that is required is only light applied to the section of the subject which needs to be read. In addition, it is costly, laborious, and time-consuming to install a number of LEDs on the printed-wiring board.

Japanese laid-open patent publications Nos. 8-163320 and 10-126581 disclose an image sensor having a rod-shaped light guide.

As shown in FIG. 7 of the accompanying drawings, the disclosed image sensor comprises a rod-shaped light guide 101 mounted in a casing 100. The rod-shaped light guide 101 has a basically rectangular cross-sectional shape lying in a direction perpendicularly to the longitudinal direction thereof which is normal to the sheet of FIG. 7. The rod-shaped light guide 101 has a beveled corner surface 102 serving as an exit surface. The image sensor also has a light-emitting element (not shown) such as an LED mounted on an longitudinal end of the rod-shaped light guide 101. Light emitted from the light-emitting element is introduced as illuminating light into the rod-shaped light guide 101 from its longitudinal end. The illuminating light as it is propagated through the rod-shaped light guide 101 is scattered by a light scattering pattern 103 formed on a side of the rod-shaped light guide 101. The scattered light is emitted from the exit surface 102 and transmitted through a cover glass panel 104 as a subject holder to the image surface of a subject placed on the cover glass panel 104. Light reflected from the image surface is focused by a rod lens array 105 onto a photoelectric transducer 106, which reads the image of the subject.

In the above conventional arrangement, the light scattering pattern 103 is shaped in order to reduce light intensity irregularities in the longitudinal direction of the rod-shaped light guide 101, i.e., the main scanning direction. However, a spatial light intensity distribution in the auxiliary scanning direction remains to be improved.

Specifically, illuminating light emitted from the exit surface of a rod-shaped light guide which has a rectangular or similar cross-sectional shape contains light reflected in multiple paths or scattered in the light guide in addition to scattered light produced by the light scattering pattern, as shown in FIG. 8 of the accompanying drawings. Therefore, such illuminating light fails to achieve an optimum illuminated state on the image surface to be read in the auxiliary scanning direction.

More specifically, the conventional rod-shaped light guide, which does not have a condensing function and a function to adjust the peak of a spatial light intensity distribution is liable to produce multi-reflected light and scattered light that are more intensive than the scattered light from the light scattering pattern. Thus, the peak of the spatial light intensity distribution in the auxiliary scanning direction is shifted toward the rod-shaped light guide, i.e., to the right in FIG. 8, out of a position directly above the rod lens array.

The above drawback can be reduced to a certain extent by shortening the distance between the rod-shaped light guide 101 and the rod lens array 105. However, if the distance between the rod-shaped light guide and the rod lens array is shortened, the illuminating light from the rod-shaped light guide may be reflected directly by a surface of the cover glass panel 104, or reflected by the surface of the subject, if the subject is lustrous, resulting in bright reflections from the image to be read.

Another solution is to tilt the rod-shaped light guide 101 to move the peak of the spatial light intensity distribution away, i.e., to the right in FIG. 8, into alignment with the position directly above the rod lens array. This approach, however, is not effective because it increases the extent of the spatial light intensity distribution.

It has been known to make the exit surface convex to converge the emitted illuminating light. With this proposed, however, it is difficult to make adjustments to position the peak of the spatial light intensity distribution in alignment with the position directly above the rod lens array, and the space availability in the image sensor is limited by the convex exit surface.

SUMMARY OF THE INVENTION

It is therefore an object of the present invention to provide a rod-shaped light guide which is capable of bringing the peak of a spatial light intensity distribution in an auxiliary scanning direction into alignment with an image surface to be read.

Another object of the present invention is to provide an illuminating device which incorporates such a rod-shaped light guide.

According to the present invention, there is provided a rod-shaped light guide for reflecting illuminating light entered from one end thereof with inner surfaces thereof and emitting reflected illuminating light from an exit surface lying in a longitudinal direction thereof, the rod-shaped light guide having side surfaces extending in the longitudinal direction thereof, the side surfaces including a planar exit surface, a planar surface with a light scattering pattern disposed thereon, and a curved reflecting surface for reflecting scattered light from the light scattering pattern toward the exit surface, the curved reflecting surface having a cross-sectional shape which lies perpendicularly to the longitudinal direction and comprises a portion of an elliptical shape, the light scattering pattern being disposed near a focus of the elliptical shape.

With the above arrangement, the light scattering pattern and an image surface illuminated by scattered light from the light scattering pattern are brought into focused relationship to each other i.e., the scattered light from the light scattering pattern can be focused onto the image surface to be read.

Illuminating light may be introduced into the rod-shaped light guide from opposite ends thereof. The light scattering pattern may be of any desired shape.

The planar surface with the light scattering pattern disposed thereon may include a major axis of the elliptical shape, and the exit surface may include a minor axis of the elliptical shape.

The planar surface with the light scattering pattern disposed thereon may include a major axis of the elliptical shape, and the exit surface may include a side inclined to a minor axis of the elliptical shape.

The planar surface with the light scattering pattern disposed thereon may include a side parallel to a minor axis of the elliptical shape, and the exit surface may include a minor axis of the elliptical shape.

The planar surface with the light scattering pattern disposed thereon and the exit surface may comprise a single surface.

According to the present invention, there is also provided an illuminating device comprising a casing, a rod-shaped light guide for reflecting illuminating light entered from one end thereof with inner surfaces thereof and emitting reflected illuminating light from an exit surface lying in a longitudinal direction thereof, the rod-shaped light guide having side surfaces extending in the longitudinal direction thereof, the side surfaces including a planar exit surface, a planar surface with a light scattering pattern disposed thereon, and a curved reflecting surface for reflecting scattered light from the light scattering pattern toward the exit surface, the curved reflecting surface having a cross-sectional shape which lies perpendicularly to the longitudinal direction and comprises a portion of an elliptical shape, the light scattering pattern being disposed near a focus of the elliptical shape, the rod-shaped light guide being housed in the casing with the exit surface exposed, and light-emitting means for emitting light, the light-emitting means being mounted on an end of the rod-shaped light guide, the light scattering pattern being progressively wider from the end of the rod-shaped light guide toward another end thereof or the light scattering pattern comprising a plurality of discrete elements at least near the end of the rod-shaped light guide.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a transverse cross-sectional view of an image reading apparatus incorporating an illuminating device according to the present invention;

FIG. 2 is a perspective view of a rod-shaped light guide according to the present invention;

DETAILED DESCRIPTION OF THE PREFERRED EMBODIMENTS

Figure 3:
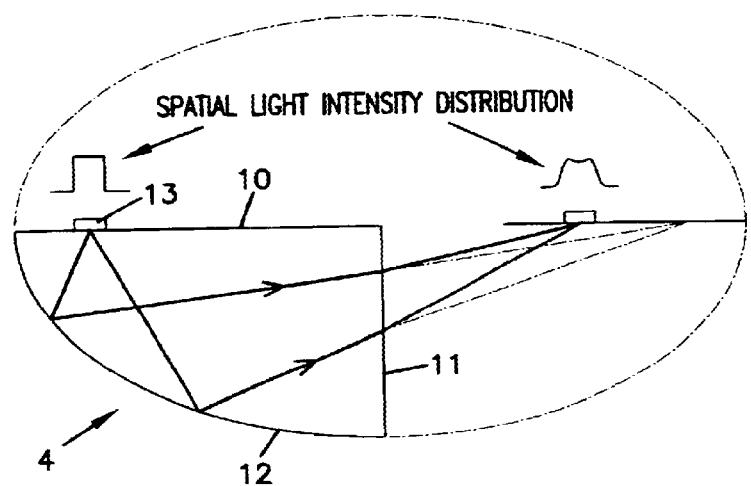
FIG. 3 is a side elevational view of the rod-shaped light guide, showing how illuminating light is reflected.

As shown in FIG. 1, an image reading apparatus incorporating an illuminating device according to the present invention includes a frame 1 having recesses 2, 3 defined in opposite surfaces thereof, a casing 5 disposed in the recess 2 and housing a transparent rod-shaped light guide 4, a cover glass panel 6 disposed in and closing an open end of the recess 2, a board 8 disposed in and closing an open end of the recess 3 and supporting a sensor 7, and a rod lens array 9 mounted in the frame 1 and positioned between the recesses 2, 3.

The rod-shaped light guide 4 is preferably made of a highly light-transmissive synthetic resin such as acrylic resin, polycarbonate, etc., or highly light-transmissive optical glass.

As shown in FIGS. 2 and 3, the rod-shaped light guide 4 has a partly elliptical cross-sectional shape lying in a direction perpendicularly to the longitudinal direction thereof. Specifically, the cross-sectional shape of the rod-shaped light guide 4 comprises a quarter of an elliptical shape, and the rod-shaped light guide 4 has side surfaces which include a planar surface 10 including a major axis of the elliptical shape, a planar surface 11 including a minor axis of the elliptical shape, and a curved surface 12 including a peripheral edge of the elliptical shape. The planar surfaces 10, 11 are positioned adjacent to each other and angularly spaced 90° from each other.

A light scattering pattern 13 is disposed on the planar surface 10. Since the curved surface 12 forms part of the elliptical shape, if the curved surface 12 is regarded as a concave mirror, then the focus of the curved surface 12 is present on the planar surface 10. The light scattering pattern 13 is formed in alignment with the focus of the curved surface 12. Specifically, the light scattering pattern 13 is formed in the vicinity of the focus of the curved surface 12 because the light scattering pattern 13 has a width.

The light scattering pattern 13 is formed by printing a white paint. However, the light scattering pattern 13 may be formed in any of various colors other than white depending on the wavelength of light that is used. For example, if the image reading apparatus is used in a facsimile machine, then since many facsimile machines use light having a wavelength of 570 nm, the light scattering pattern 13 may be formed in a color having that wavelength. The light scattering pattern 13 may be formed by bonding a film which has a desired color to the planar surface 10.

The light scattering pattern 13 comprises a succession of discrete strips spaced at intervals that are progressively smaller from one end of the rod-shaped light guide 4 where a light-emitting means 14 such as an LED is positioned toward the other end of the rod-shaped light guide 4. The light scattering pattern 13 thus constructed is capable of making constant the amount of scattered light in the longitudinal direction of the rod-shaped light guide 4. The light-emitting means 14 is attached to the casing 5.

In order to make constant the amount of scattered light in the longitudinal direction for thereby reducing light intensity irregularities, the light scattering pattern 13 may comprise a continuous elongate strip that is progressively wider from the one end of the rod-shaped light guide 4 to the other end thereof. Alternatively, the light scattering pattern 13 may comprise a succession of discrete strips spaced at intervals that are progressively smaller from the one end of the rod-shaped light guide 4 to the other end thereof with the strips being progressively wider from the one end of the rod-shaped light guide 4 to the other end thereof.

The image reading apparatus shown in FIGS. 1 through 3 operates as follows: Light generated by the light-emitting mean 14 enters the transparent rod-shaped light guide 4, and is scattered by the light scattering pattern 13 disposed on the planar surface 10, reflected by the curved surface 12, and emitted from the planar surface 11 as an exit surface. The emitted light is then transmitted through the cover glass panel 6 and applied to the image surface 16 of a subject 15 which is to be read. Light reflected from the image surface 16 is focused by the rod lens array 9 onto the sensor 7, which reads the image of the subject 15.

Since the light scattering pattern 13 is disposed near the focus of the curved surface 12 as the concave mirror, the scattered light reflected by the curved surface 12 and emitted from the planar surface 11 is focused at a predetermined focused position. If the predetermined focused position and the image surface 16 are aligned with each other, then, as shown in FIG. 3, the scattered light from the light scattering pattern 13 falls fully on the image surface 16 without being wasted, so that the spatial light intensity distribution in the auxiliary scanning direction is uniformized.

Figure 4:
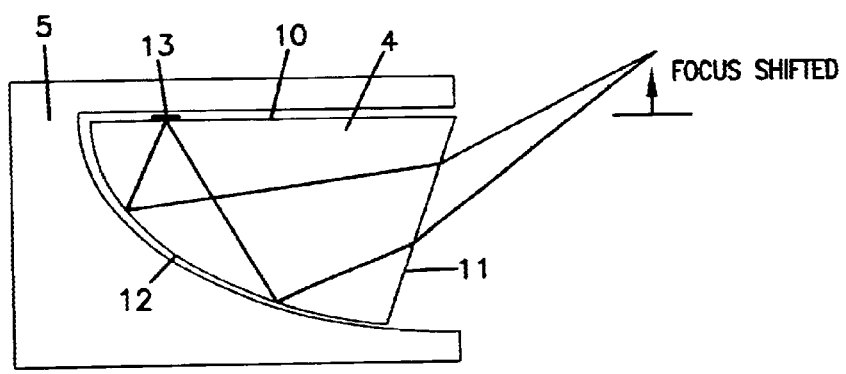
FIG. 4 is a view similar to FIG. 3, showing a rod-shaped light guide according to another embodiment of the present invention.
Figure 5:
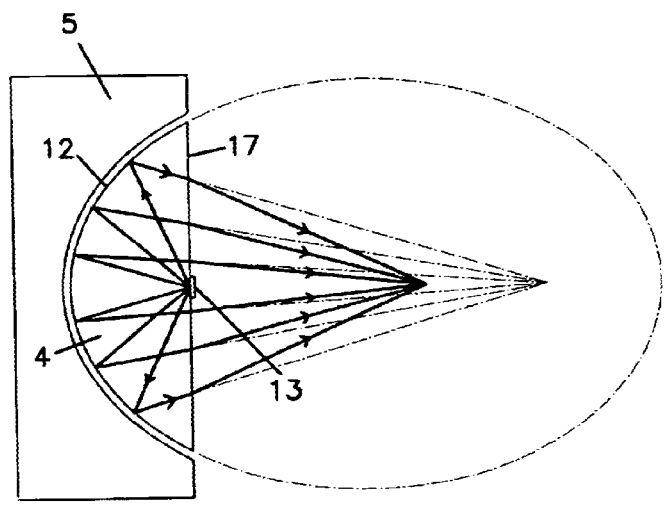
FIG. 5 is a view similar to FIG. 3, showing a rod-shaped light guide according to still another embodiment of the present invention.
Figure 6:
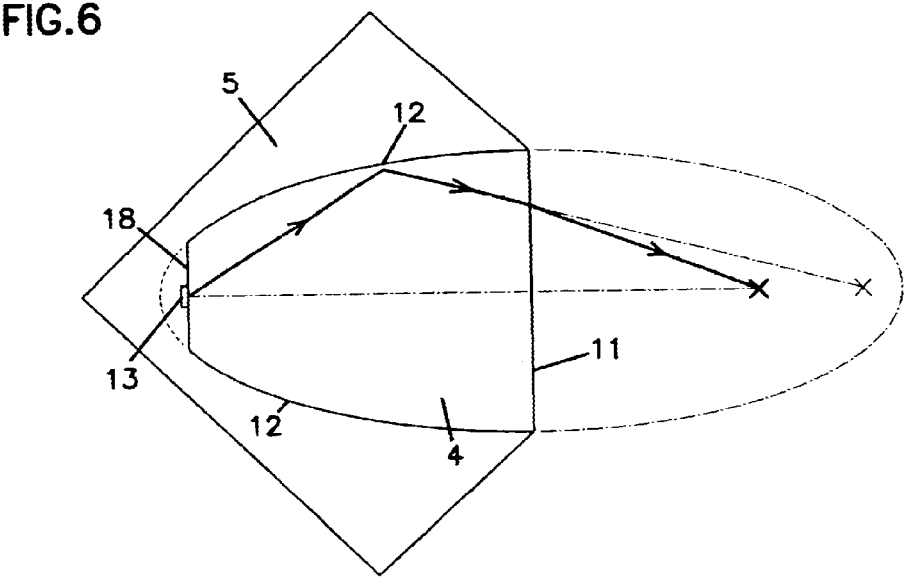
FIG. 6 is a view similar to FIG. 3, showing a rod-shaped light guide according to yet another embodiment of the present invention.
Figure 7:
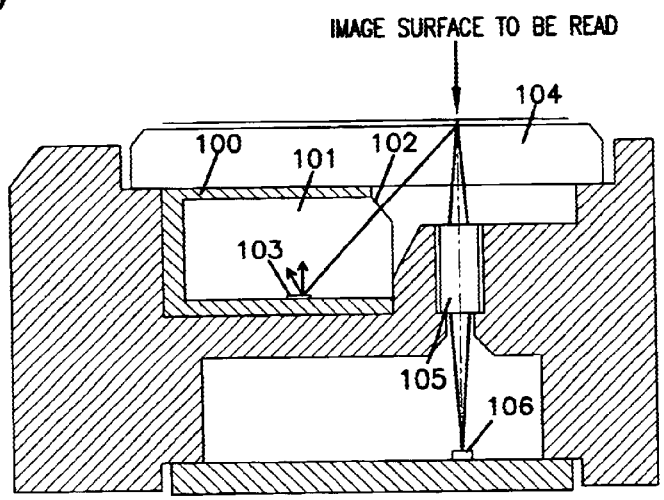
FIG. 7 is a transverse cross-sectional view of a conventional image reading apparatus.
Figure 8:
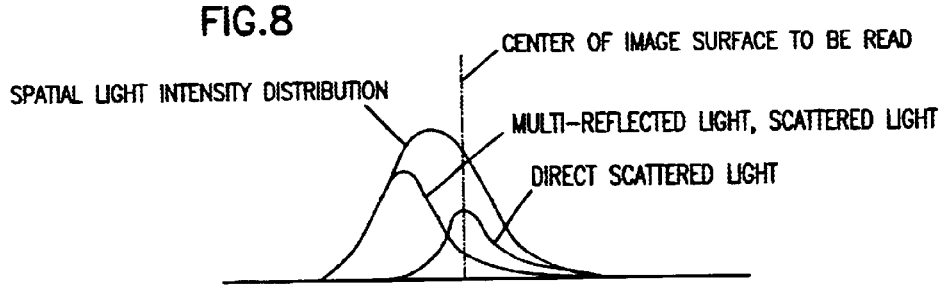
FIG. 8 is a diagram showing a spatial light intensity distribution in the conventional image reading apparatus.

FIGS. 4 through 6 are similar to FIG. 3, showing rod-shaped light guides according to other embodiments of the present invention.

According to the embodiment shown in FIG. 4, a rod-shaped light guide 4 has a partly elliptical cross-sectional shape which comprises a portion of an elliptical shape. The rod-shaped light guide 4 has a planar surface 10 including a major axis of the elliptical shape, a planar surface 11 angularly displaced from a minor axis of the elliptical shape, and a curved surface 12 including a peripheral edge of the elliptical shape. The light scattering pattern 13 is placed on the planar surface 10. The planar surface 11 serves as an exit surface. The planar surfaces 10, 11 are positioned adjacent to each other and angularly spaced from each other by an angle smaller than 90°. The planar surface 11 thus angularly spaced from the planar surface 10 is able to shift the focus position depending on the position of the image surface to be read.

According to the embodiment shown in FIG. 5, a rod-shaped light guide 4 has a partly elliptical cross-sectional shape which comprises a portion of an elliptical shape. The rod-shaped light guide 4 has a planar surface 17 lying parallel to a minor axis of the elliptical shape and a curved surface 12 including a peripheral edge of the elliptical shape. The light scattering pattern 13 is placed on the planar surface 17, which also serves as an exit surface. The focus of the elliptical shape, part of which forms the curved surface 12, is present on the planar surface 17, and the light scattering pattern 13 is positioned near the focus of the curved surface 12. Illuminated light scattered by the light scattering pattern 17 and emitted from the planar surface 17 is converged onto a certain focused position outside of the rod-shaped light guide 4. If the image surface is aligned with the focused position, then the image surface can be illuminated efficiently with a constant light intensity distribution.

According to the embodiment shown in FIG. 6, a rod-shaped light guide 4 has a partly elliptical cross-sectional shape which comprises a portion of an elliptical shape. The rod-shaped light guide 4 has a planar surface 11 parallel to a minor axis of the elliptical shape and serving as an exit surface, a curved surface 12 including a peripheral edge of the elliptical shape, and a planar surface 18 lying parallel to the minor axis of the elliptical shape and supporting the light scattering pattern 13 thereon. The focus of the elliptical shape, part of which forms the curved surface 12 is present on the planar surface 18, which corresponds to the planar surface 17 shown in FIG. 5.

The above embodiments may be modified in various ways. In the embodiments shown in FIGS. 3 and 4, the planar surface 10 is aligned with the major axis of she elliptical shape. However, insofar as the light scattering pattern 13 is positioned near the focus of the elliptical shape, the planar surface 10 and the major axis of the elliptical shape may not necessarily be aligned with each other.

In the embodiment shown in FIG. 5, the planar surface 17 may not necessarily extend parallel to the minor axis of the elliptical shape insofar as the light scattering pattern 13 is positioned near the focus of the elliptical shape which includes the curved surface 12 as part thereof.

In the embodiment shown in FIG. 6, the planar surface 18 and the planar surface 11 may not necessarily extend parallel to the minor axis of the elliptical shape. The planar surface 18 may have ends beveled or rounded or may not necessarily comprise a single flat surface.

According to the present invention, as described above, since the light scattering pattern on a side of the rod-shaped light guide and the image surface to be read which is illuminated by scattered light from the light scattering pattern are held in focused relationship to each other, the peak of the spatial light intensity distribution is brought into alignment with the image surface to be read which is positioned directly above the rod lens array.

Because the position onto which the scattered light is converged can be adjusted by changing the curved reflecting surface of the rod-shaped light guide, adjustments can easily be made to bring the light scattering pattern and the image surface into focused relationship to each other.

With the light scattering pattern and the image surface being held in focused relationship to each other, the area of the image surface which is illuminated by the scattered light can easily be adjusted by changing the width of the light scattering pattern.

Although certain preferred embodiments of the present invention have been shown and described in detail, it should be understood that various changes and modifications may be made therein without departing from the scope of the appended claims.

What is claimed is:

1. A rod-shaped light guide for reflecting illuminating light entered from one end thereof with inner surfaces thereof and emitting reflected illuminating light from an exit surface lying in a longitudinal direction thereof, said rod-shaped light guide having side surfaces extending in the longitudinal direction thereof, said side surfaces including a planar exit surface, a planar surface with a light scattering pattern disposed thereon, and a curved reflecting surface for reflecting scattered light from said light scattering pattern toward said exit surface, said curved reflecting surface having a cross-sectional shape which lies perpendicularly to said longitudinal direction and comprises a portion of an elliptical shape, said light scattering pattern being disposed near a focus of said elliptical shape.

2. A rod-shaped light guide according to claim 1, wherein said planar surface with said light scattering pattern disposed thereon includes a major axis of said elliptical shape.

3. A rod-shaped light guide according to claim 1, wherein said planar surface with said light scattering pattern disposed thereon includes a major axis of said elliptical shape, and said exit surface includes a side inclined to a minor axis of said elliptical shape.

4. A rod-shaped light guide according to claim 1, wherein said planar surface with said light scattering pattern disposed thereon includes a side parallel to a minor axis of said elliptical shape.

5. A rod-shaped light guide according to claim 1, wherein said planar surface with said light scattering pattern disposed thereon and said exit surface comprise a single surface.

6. An illuminating device comprising:

a casing;

a rod-shaped light guide for reflecting illuminating light entered from one end thereof with inner Surfaces thereof and emitting reflected illuminating light from an exit surface lying in a longitudinal direction thereof, said rod-shaped light guide having side surfaces extending in the longitudinal direction thereof, said side surfaces including a planar exit surface, a planar surface with a light scattering pattern disposed thereon, and a curved reflecting surface for reflecting scattered light from said light scattering pattern toward said exit surface, said curved reflecting surface having a cross-sectional shape which lies perpendicularly to said longitudinal direction and comprises a portion of an elliptical shape, said light scattering pattern being disposed near a focus of said elliptical shape;

said rod-shaped light guide being housed in said casing with said exit surface exposed; and light-emitting means for emitting light, said light-emitting means being mounted on an end of said rod-shaped light guide;

said light scattering pattern being progressively wider from said end said rod-shaped light guide toward another end thereof.

7. An illuminating device comprising:

a casing;

a rod-shaped light guide for reflecting illuminating light entered from one end thereof with inner surfaces thereof and emitting reflected illuminating light from an exit surface lying in a longitudinal direction thereof, said rod-shaped light guide having side surfaces extending in the longitudinal direction thereof, said side surfaces including a planar exit surface, a planar surface with a light scattering pattern disposed thereon, and a curved reflecting surface for reflecting scattered light from said light scattering pattern toward said exit surface, said curved reflecting surface having a cross-sectional shape which lies perpendicularly to said longitudinal direction and comprises a portion of an elliptical shape, said light scattering pattern being disposed near a focus of said elliptical shape;

said rod-shaped light guide being housed in said casing with said exit surface exposed; and light-emitting means for emitting light, said light-emitting means being mounted on an end of said rod-shaped light guide;

said light scattering pattern comprising a plurality of discrete elements at least near said end of said rod-shaped light guide.

8. An illuminating device according to claim 6, wherein said planar surface with said light scattering pattern disposed thereon includes a major axis of said elliptical shape.

9. An illuminating device according to claim 6, wherein said planar surface with said light scattering pattern disposed thereon includes a major axis of said elliptical shape, and said exit surface includes a side inclined to a minor axis of said elliptical shape.

10. An illuminating device according to claim 6, wherein said planar surface with said light scattering pattern disposed thereon includes a side parallel to a minor axis of said elliptical shape.

11. An illuminating device according to claim 7, wherein said planar surface with said light scattering pattern disposed thereon includes a major axis of said elliptical shape.

12. An illuminating device according to claim 7, wherein said planar surface with said light scattering pattern disposed thereon includes a major axis of said elliptical shape, and said exit surface includes a side inclined to a minor axis of said elliptical shape.

13. An illuminating device according to claim 7, wherein said planar surface with said light scattering pattern disposed thereon includes a side parallel to a minor axis of said elliptical shape.

14. An illuminating device according to claim 7, wherein said planar surface with said light scattering pattern disposed thereon and said exit surface comprise a single surface.

* * * * *